United States Patent [19]
Yoshikawa et al.

[11] 3,772,799
[45] Nov. 20, 1973

[54] APPARATUS FOR TREATING A MIXTURE

[75] Inventors: Yoshio Yoshikawa; Hiroshi Kondo; Akitoshi Sugio; Tomotake Kato, all of Tokyo, Japan

[73] Assignee: Mitsubishi Edogawa Kagaku Kabushiki Kaisha, Tokyo, Japan

[22] Filed: Mar. 20, 1972

[21] Appl. No.: 236,526

Related U.S. Application Data
[62] Division of Ser. No. 851,396, Aug. 19, 1969, Pat. No. 3,664,035.

[52] U.S. Cl............................ 34/92, 34/108, 165/88
[51] Int. Cl............................................... F26b 13/30
[58] Field of Search .................... 34/92, 108; 165/88

[56] References Cited
UNITED STATES PATENTS

| | | | |
|---|---|---|---|
| 2,808,657 | 8/1957 | Osborne et al. | 34/92 |
| 2,884,229 | 4/1959 | Francis et al. | 165/88 |
| 3,554,038 | 1/1971 | Sweeney et al. | 34/92 |
| 3,565,168 | 2/1971 | Powell et al. | 165/88 |

*Primary Examiner*—Meyer Perlin
*Assistant Examiner*—Ronald C. Capossela
*Attorney*—John Thomas Cella

[57] ABSTRACT

The apparatus of this invention is suitable for treating a labile material in a state free from deteriorating factors. Filtration, washing, drying and mixing operations can be effected in this single apparatus. The apparatus comprises a vessel, a filter plate, cylindrical rotating shafts, and a suction member provided inside said vessel to be stationary while the vessel rotates and to be located at a site where contact of said suction member and the solid contents of the vessel during rotation thereof is minimal.

6 Claims, 3 Drawing Figures

APPARATUS FOR TREATING A MIXTURE

This is a divisional of Ser. No. 851,396 filed Aug. 19, 1969, now U.S. Pat. No. 3,664,035.

This invention relates to an apparatus for treating a mixture, and more particularly, to a filtering, drying and mixing apparatus of batch system.

According to the apparatus of this invention, a slurry can be filtered and washed under pressure or reduced pressure, and then vacuum drying can be effected in the same vessel by rotating the vessel to obtain dried crystal, and if desired, other crystals can be added to the dried crystal as obtained above. The apparatus of this invention can effectively carry out three processes in the one vessel. Therefore, the apparatus of this invention can be appropriately used for the following uses :

1. The formed crystal is easily decomposed (for example, oxidized) and therefore, it is necessary to treat the crystal as soon as possible in a closed system in an inert atmosphere or under vacuum.
2. There is a temperature limit, only within which the formed crystal can be stably present and therefore it is necessary that the temperature distribution is uniform and the drying is carried out as soon as possible.
3. Moisture in the finallydried matter (product) should be extremely low.
4. It is desired to recover the evaporated solvent as effectively as possible.
5. It is desired to retain the product in a good particle state and avoid that the product becomes fine powder.
6. It is required that the product is not dirty and the quality is extremely uniform.
7. It is necessary to compound optionally the product with the other substances and the resulting composition is highly uniform.
8. It is desired to carry out filtration, washing, drying, and mixing in a compact system.
9. The product is expensive and the loss caused during transferring the product should be reduced to minimum.

The apparatus of this invention comprises a vertical cylindrical treating vessel, a filter plate provided at the bottom portion of the treating vessel, a heating jacket provided at the outside of the treating vessel, cylindrical rotating shaft provided on the both side of trunk of the treating vessel so as to rotate the treating vessel, one shaft having inside an inlet of a heating medium and an outlet thereof, and the other shaft having inside an outlet of the filtrate and an outlet of the inside gas.

When the apparatus of this invention is used as a filter by discharging the filtrate from one of the shafts, a usual filtration can be effected. Then, drying under reduced pressure can be carried out by sucking the inside gas through an outlet while rotating the treating vessel. Further, the treating vessel of this invention is provided with a suction member serving the drying under reduced pressure at a site in the vessel where crystals in the vessel do not contact the suction member. If the suction member is placed at a site where the crystals contact the suction member, the drying is disturbed. For example, when the suction of the inside gas is effected through the filter plate after the inside liquid has been almost withrawn, the drying under vacuum may be satisfactorily effected in a relatively small apparatus while the drying under vacuum can not be effectively carried out in a large apparatus since the resulting cake hardly leaves from the filtering surface and disturbs the effective contact of the cake with the heating surface and the suction is not sufficiently effected due to the high pressure drop caused by the adhering of the cake to the filtering surface.

The present invention has successfully solved such problems by providing a vessel with a suction member at a site where crystals do not contact the suction member. Thus, the crystals are not sucked towards the filter plate, but leave easily the filter plate and are effectively transferred and dispersed to contact the heating portion and avoid the adhering of the crystals to the suction member and thus the drying can be effected smoothly.

The following table shows the test result conducted by a bench scale apparatus and a commercial scale apparatus.

| Volume of the vessel Suction type | Through filter plate |
|---|---|
| Heating surface of jacket | 1.8 m² |
| Average temperature of jacket and coil | 90°C |
| Time of constant period of drying | 120 min. |
| Pressure difference between inside and outside at the end of constant period of drying | 31 mmHg |
| Suction reduced pressure | 10 – 15 mmHg |
| Drying speed (at 90%) (Kg./hr. Kg. product) | 0.0919 |
| $V_1$ Kcal/m². hr. °C. (at 60% evaporation of medium) | 39 |
| $V_2$ Kcal/m². hr. °C. (at 90% evaporation of medium) | 23 – 27 |
| Average at constant period of drying V Kcal/m². hr. °C. | 26 |
| Material (Kg.) | 108.0 |
| Specific gravity (appearance) | 0.8 |
| Granularity (Mesh) (averaged) | 130 |
| Amount of recovered solvent (Kg.) | 31.0 |

As shown in the above table, the drying velocity according to the present invention in which the suction is effected through a suction member other than the filtering plate, is remarkably higher than that when the suction is effected through the filtering plate.

To provide a better understanding of the invention a particular embodiment thereof will be described and illustrated in the drawings in which.

Figure 1:
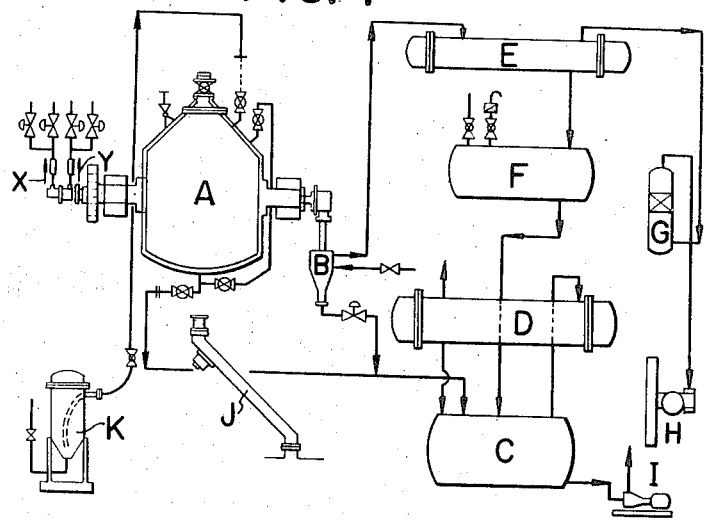
FIG. 1 shows diagrammatically the apparatus of this invention and the related apparatuses for recovering crystals.
Figure 2:
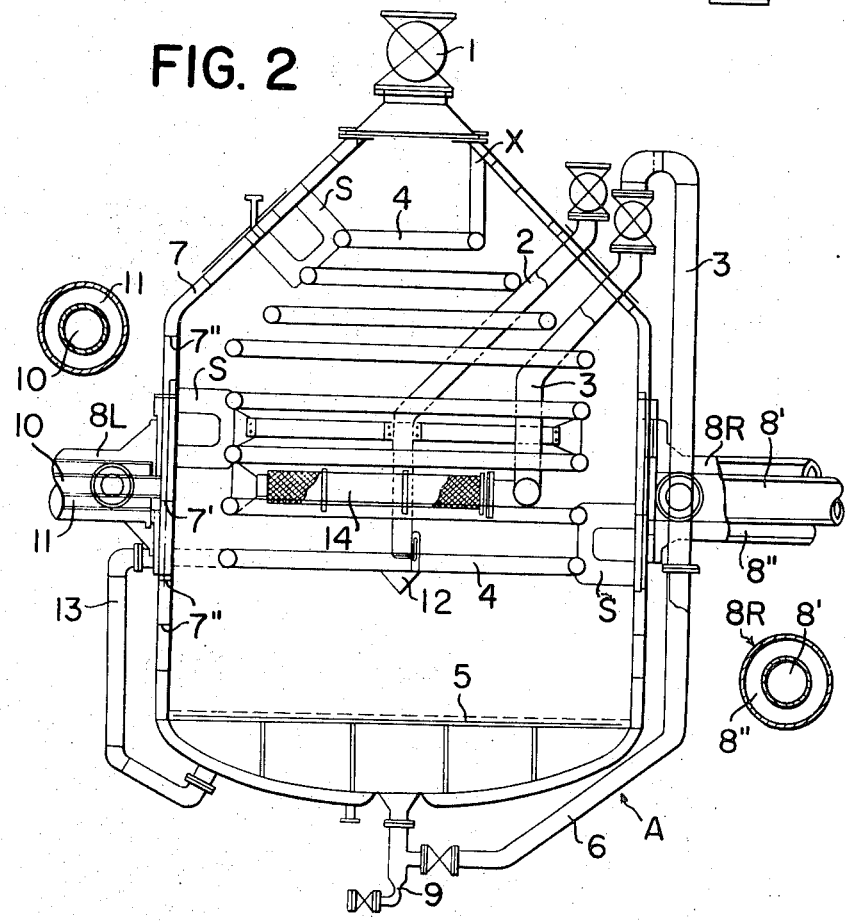
FIG. 2 is a vertical cross sectional view of an embodiment of apparatus according to this invention.

In FIG. 1, A is an apparatus for filtering drying and mixing according to this invention, B is an intermediate reservoir, C is a filtrate tank, D is a cold trap, E is a cold trap, F is a condensate reservoir, G is a trap, H is a vacuum pump, I is a pump for withdrawing a filtrate, J is a chute for discharging a product, and K is a weighing vessel for additive. X is connected with the inner pipe 10 (in FIGS. 2 and 3) and Y is connected with the outer pipe 11 (in FIGS. 2 and 3). In FIG. 2, there is shown an embodiment of the filtering, drying and mixing apparatus (A in FIG. 1). The apparatus comprises a vessel which is cylindrical at the middle part, conical at the upper part, and a filter plate 5 is fixed to the lower part. A product outlet 1 is provided on the top of the conical portion, and a slurry charging pipe 2 and an exhaust pipe 3 are fixed to and penetrate the side wall of the conical portion. A slurry is fed to the vessel through the slurry charging pipe 2, dispersed uniformly on the filter plate and filtered. The filtrate is discharged through the filtrate discharging hole at the bottom of the vessel, the discharging pipe 6, the annular portion 8'' of the right side shaft 8R and the intermediate reservoir B (in FIG. 1). The drain discharging pipe is designated as 9. The outside of the vessel is double wall, that is, the vessel is surrounded with a jacket 7. If desired, a coil 4 is provided in the vessel. The left side cylindrical shaft 8L comprises an inner pipe 10 and an outer pipe 11. A heat transfer medium enters through the inner pipe 10, circulates through the upper jacket portion, passes through the top conical portion X, the coil 4 in the vessel, the joint pipe 13, the jacket at the outside bottom of the vessel, then circulates the jacket towards upper portion and is discharged through the outer pipe 11 of the left hand cylindrical shaft 8L. 7' denotes a partition plate separating the jacket to the upper portion and the lower portion, 7' is a baffle plate in each portion, and S is a supporting plate for the coil 4. Upon cooling the vessel, water is circulated through the path as mentioned above in place of the heat transfer medium. To the ends of both cylindrical shafts are fixed well known rotary joints (not shown) to which conduits are connected for effecting smoothly the operation.

The operation conducted by the apparatus of this invention is exemplified as the following.

Eight thousand liters of a water — methanol solution containing 1,500 Kg. of sodium hydrosulfite are introduced into the filtering, drying and mixing apparatus A through the charging pipe 2 by sending under carbon dioxide gas pressure. The slurry is filtered by pressure and the crystal deposits on a filter plate 5. The filtrate enters the filtrate reservoir C (in FIG. 1) from the bottom of the intermediate reservoir B (in FIG. 1) through the bottom of the vessel, the discharging pipe 6, the right hand cylindrical shaft and the rotary joint. The accompanying pressure gas the the methanol vapor are caught by the cold trap D (in FIG. 1). When the sodium hydrosulfite crystal cake becomes about 50 cm. in thickness, if desired, methanol is sprayed again to the crystal through a slurry charging pipe 2 and filtered by pressure. Then, the charging joint pipe is taken off so as to enable the vessel to be rotatable. The vessel is rotated around the cylindrical shaft. The valve of the discharging pipe at the bottom of the vessel is closed and the gas in the vessel is evacuated by a vacuum pump to reduced the pressure in the vessel. The vapor is evacuated through the suction member 14, the gas exhaust pipe 3, the inner pipe 8' in the right side cylindrical shaft BR and the intermediate reservoir B (in FIG. 1). On the other hand, hot water is charged from the left side cylindrical shaft and circulates the jacket and the coil and discharged. The evacuated vapor is condensed in the cold trap E (in FIG. 1) and collected in the reservoir F (in FIG. 1). The drying finishes in 2 hours. If necessary, an additive is added from the additive weighing vessel K and mixed uniformly. After the vacuum drying is finished, the rotation of the vessel is stopped retaining the product outlet downward and the pressure is returned to atmospheric pressure. Then, the product outlet is connected with the product outlet chute to discharge slowly the product by the operation of the flow valve. In the above process the product is hardly lost from the feeding of the slurry to the discharge of the product.

There are considered several methods by which there occurs no pressure drop at a site of the suction member, and the suction is effectively carried out. When a suction member is fixed to a filter plate, the suction is disturbed by the crystal cake deposited on the filter plate as mentioned above. Further, the drying is conducted by rotating the vessel in the present invention. If the suction member is located at a site which passes the lower portion of the vessel while the vessel is rotated, the suction member is covered with crystals falling down from the upper part and thereby the suction is disturbed.

Therefore, in such a structure that the suction member rotates together with the vessel as in this invention, it is necessary to the suction member to a site which is farthest from both the top and the bottom of the vessel, that is, the product outlet 1 and the filter plate 5. Thus, the suction can be operated substantially without contacting the suction member with crystals.

Figure 3:
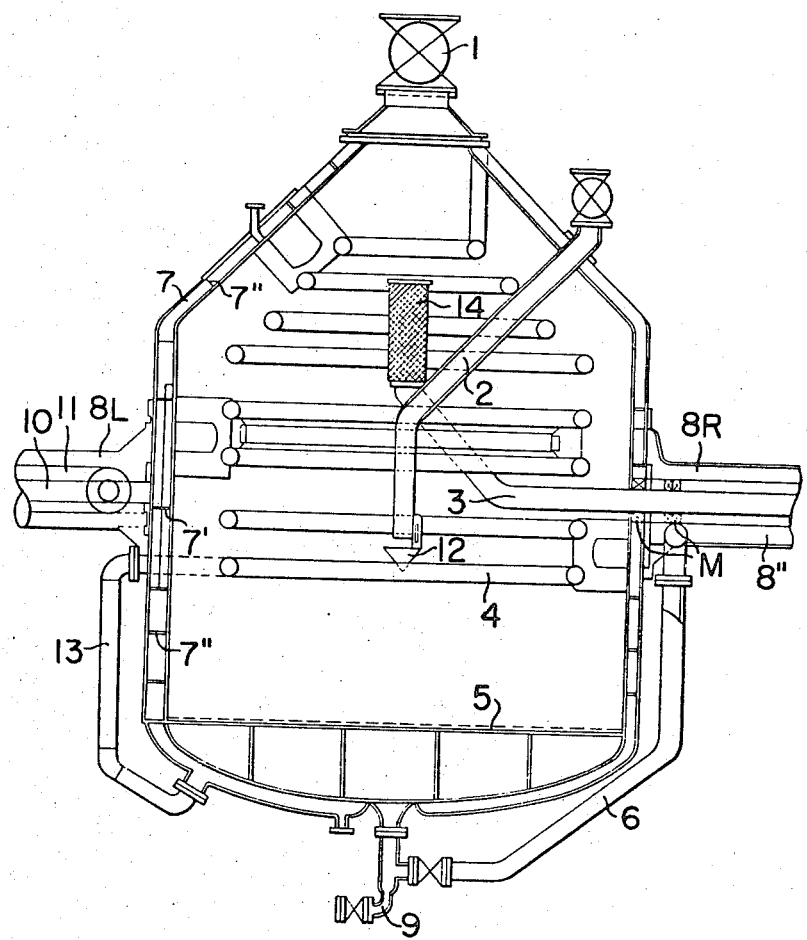
FIG. 3 is a vertical cross sectional view of other embodiment of apparatus according to this invention.

In FIG. 3 there is shown another embodiment of this invention particularly with respect to the suction member. The same numerals as those in FIG. 2 denote the same parts. The suction member 14 is so arranged that the suction member 14 is not rotated regardless of the rotation of the vessel. In this case, it is preferable to locate the suction member at a relatively high site for the purpose of effecting good suction. The gas exhaust pipe 3 attached to the suction member 14 is connected with the shaft 8R at the inner diameter of the outer pipe 8'' by using mechanical seal M and fixed at the outer end (not shown).

According to the apparatus of this invention, four operations such as filtration, washing, drying and mixing can be carried out in one and the same vessel without contacting air, and therefore it is suitable for treating substances which are unstable in air. Further, crystals can sufficiently contact the heating portion and the suction can be effectively conducted to reduced the drying time.

What is claimed is:

1. Apparatus for treating a mixture which comprises a vessel having a trunk and having a jacket for passing a heat transfer medium, a filter plate provided near the bottom of said vessel, cylindrical shafts provided at the both sides of the trunk of said vessel, said shafts having therein a feeding path and a discharging path for the heat transfer medium and a discharging path for liquid and gas from the inside of said vessel, and a suction member provided in said vessel at a site where a material to be dried minimally contacts said suction member when said vessel is rotated around the cylindrical shaft, said suction member remaining stationary when said vessel is rotated around the cylindrical shaft.

2. Apparatus according to claim 1 in which the vessel is provided therein with a heat transfer coil.

3. Apparatus according to claim 1 in which said suction member is located substantially at the center of the vessel, preferred with at a slightly higher portion than the center.

4. Apparatus according to claim 1 in which the vessel is provided with the heat transfer coil located near the inside wall of the vessel.

5. Apparatus for treating a mixture comprising a vessel having a trunk and having a jacket for passing a heat transfer medium, a filter plate provided near the bottom of said vessel, cylindrical shafts provided on both sides of the trunk of said vessel, said shafts having therein a feeding path and a discharging path for the heat transfer medium and a discharging path for liquid and gas from the inside of said vessel, said vessel being rotatable around said cylindrical shafts, and a stationary suction member provided in said vessel at a site where contact of said suction member and the solid contents of the vessel during rotation thereof will be minimal.

6. Apparatus for treating a mixture containing easily oxidizable material which comprises a vessel having a closeable solids outlet opening into the vessel at the top of said vessel, a closeable inlet having an end opening within the vessel, a jacket for passing a heat transfer medium, a filter plate provided near the bottom of said vessel, cylindrical shafts for the rotation of the vessel, provided on opposite sides of a middle portion of said vessel, one of said shafts having therein a feeding path and a discharging path for liquid and gas from the inside of said vessel, and a suction member provided inside said vessel to be stationary while the vessel rotates and to be located at a site where contact of said suction member and the solid contents of the vessel during rotation thereof will be minimal, said suction member communicating with said discharging path for liquid and gas, and a closeable filtrate outlet extending from the bottom of said vessel and communicating with said discharging path for liquid and gas.

* * * * *

UNITED STATES PATENT OFFICE
CERTIFICATE OF CORRECTION

Patent No. 3,772,799                              Dated November 20, 1973

Inventor(s) Yoshio Yoshikawa et al.

It is certified that error appears in the above-identified patent and that said Letters Patent are hereby corrected as shown below:

Column 3, line 16, "7 " should read -- 7 --. Column 4, lines 40 and 41, "at the both sides" should read -- at both sides --. Page 5(2) of the original specification as shown on the attached sheet should be included in column 2, after line 32.

Signed and sealed this 24th day of September 1974.

(SEAL)
Attest:

McCOY M. GIBSON JR.  
Attesting Officer

C. MARSHALL DANN  
Commissioner of Patents

| 250 ℓ | | 6000 ℓ | |
|---|---|---|---|
| Directly from inside of vessel | Directly from inside of vessel | Through filter plate | Directly from inside of vessel |
| 1.8 m$^2$ | 1.8 m$^2$ | 19 m$^2$ | 19 m$^2$ |
| 90°C | 90°C | 87°C | 87°C |
| 63 Min. | 30 Min. | 130 Min. | 60 Min. |
| 8 - 13 mmHg | 8 - 13 mmHg | - | - |
| 10 mmHg | 10 mmHg | 10 mmHg | 10 mmHg |
| 0.174 | 0.367 | 0.1006 | 0.208 |
| 44.0 | 43.7 | - | - |
| 41.7 | 45.0 | - | - |
| 47 | 48 | 34.7 | 65.0 |
| 107.6 | 51.1 | 1280.0 | 1300.0 |
| 0.81 | 0.79 | 0.85 | 0.85 |
| 140 | 114 | 170 | 150 |
| 30.2 | 15.5 | 280 | 270 |